R. E. HALL.
METHOD AND MEANS FOR TRANSLATING ENERGY VARIATIONS.
APPLICATION FILED MAY 31, 1919.

1,378,345.

Patented May 17, 1921.
3 SHEETS—SHEET 1.

INVENTOR
Ray E. Hall
BY
G. C. Dean
ATTORNEY

R. E. HALL.
METHOD AND MEANS FOR TRANSLATING ENERGY VARIATIONS.
APPLICATION FILED MAY 31, 1919.

1,378,345.

Patented May 17, 1921.

INVENTOR
Roy E. Hall
BY
G. C. Dean ATTORNEY

R. E. HALL.
METHOD AND MEANS FOR TRANSLATING ENERGY VARIATIONS.
APPLICATION FILED MAY 31, 1919.

1,378,345.

Patented May 17, 1921.
3 SHEETS—SHEET 3.

UNITED STATES PATENT OFFICE.

RAY EDWIN HALL, OF CHICAGO, ILLINOIS, ASSIGNOR TO HALL RESEARCH CORPORATION, A CORPORATION OF DELAWARE.

METHOD AND MEANS FOR TRANSLATING ENERGY VARIATIONS.

1,378,345.   Specification of Letters Patent.   Patented May 17, 1921.

Application filed May 31, 1919. Serial No. 301,010.

*To all whom it may concern:*

Be it known that I, RAY E. HALL, a citizen of the United States, and resident of Chicago, in the county of Cook and State of Illinois, have invented certain new and useful Improvements in Methods and Means for Translating Energy Variations, of which the following is a specification.

My present invention concerns novel methods and means for translating energy variations, particularly feeble or high frequency variations including electrical variations, aperiodic or periodic, alternating or pulsating; and acoustic variations whether as waves in air, gas, liquid or solid, or as vibratory movements of mechanical elements, elastic or forced.

While certain features of my invention may be usefully employed for translating aperiodic variations, many of its most important features concern translation of periodic variations of definite frequency, particularly where the frequency is too high or the amount of energy too small for translation and production of sensible indications or effects by ordinary means.

For instance, the apparatus and methods herein shown were primarily devised and intended for the purpose of utilizing the extremely feeble electrical currents and sounds available in the receiver telephone of present day long distance wireless telegraph apparatus, so as to cause and control manifestation thereof with any required degree of power.

The particular result achieved in apparatus herein disclosed is the recording on ordinary ticker tape of wireless messages where the received energy is so small as to be barely audible or indeed where it is inaudible in the ordinary wireless receiver telephone. An important but subsidiary result is the elimination of errors due to static discharges of atmosphere into the wireless receiving apparatus.

Obviously the methods and means which are adequate for recording on ticker tape, afford energy capable of being relayed in an electric power circuit to control sound production or machinery operations of limitless magnitude.

The specific methods followed and apparatus employed are equally useful for translating energy variations ranging from the extremely high frequencies of the radiant waves and received oscillations of wireless telegraphy down through frequencies within and even below the limit of audibility for the human ear. In fact, another practical use to which my invention has been applied, is receiving and recording the relatively low frequencies usable in alternating current telegraphy by wires, particularly as practised in submarine cables.

As one important element of my invention involves translating the variations into sounds of frequencies well within limits of audibility, it is obvious that periodic sound waves of the required frequency derived from any other desired source, may be employed as the energy variations which are to be translated.

As another element of my invention involves the use of a sound-sensitive jet, having some of the characteristics of the well-known "singing" or "sensitive" flames of the physics books, there are certain of my improvements devised for my jet which are applicable to sensitive flames and other sensitive jets of all kinds.

As the particular jet which I prefer to use is a cooling jet of gaseous fluid, preferably air, many complications due to the heat of combustion are eliminated, and more important still, I am able to utilize a new and far more efficient method of translating and utilizing the characteristic changes in shape or dimensions of the jet which are precipitated by the transmitted sound waves or the other vibrations to which the jet is sensitive. This method consists broadly in causing the change of shape of the jet to have a cooling effect on a heat sensitive element, normally heated to high temperature by means independent of the jet. In this way I obtain the advantage of an enormous temperature drop, the difference between the temperature of my normally heated sensitive element and my cooling jet being very great as contrasted with that available where a flaming jet is employed as the source of heat for intermittently heating above normal a normally cool sensitive element. In the latter case the heat is never actually withdrawn from the sensitive element but merely varies its intensity between a high limit much lower than mine and a low limit much higher than mine. Working as I do with a cooling jet, I am able to use as the sensitive element, extremely fine wire, such as Wollaston wire, say .0002–.0004 inch in diameter, and to heat it from the inside, to an accurately predetermined upper limit of safety, by means of an electric current flowing in the wire itself. Then, radiation losses being constant, enormous variations in temperature are attainable by the alternate application and withdrawal of the cooling blast from the jet.

For many reasons, I prefer to arrange the wire or other heat sensitive device out of the normal path of the jet, but in such relation thereto that it will be subject to maximum jet discharge when the characteristic change of shape or dimension of the jet is precipitated by the sound waves or other vibrations to be translated. Since a cold jet may be made very clean-cut as compared with the ragged surfaces produced by combustion in a sensitive flame, it becomes practicable to arrange the heat sensitive element as an annulus quite closely surrounding the jet, without having it materially cooled by the normal jet yet in position to be most effectively cooled thereby when the critical change of shape or dimension is precipitated.

The above described heating and cooling of the heat sensitive element may be utilized to effect a physical, electrical or chemical quality or condition of the heat sensitive element and any such changed quality or condition may be utilized to produce the desired indication or effect. My preferred method utilizes the change of electrical resistance of the sensitive wire to produce changes of flow of electrical current therein and the changes in current are utilized to produce corresponding indications or effects. As this change is a percentage change, the greater the amount of current normally flowing the greater will be the amount of the change in current flow made available by a given change of resistance.

Hence, another important feature of this part of my invention is that by utilizing electric current to normally heat the wire to the maximum safe limit, and then effecting the variations by a cooling jet, the amount of current to be varied by the resistance change will be the greatest amount that the sensitive wire can safely carry; and that same heating current thus varied, is the current which I use in the translating device to produce the desired indication or effect. This is a marked contrast to devices employing a sensitive flame since the effectiveness of the latter requires that the wire be heated by the flame and not by the current. Hence either the electric current to be varied by the changing resistance of the wire must be kept very small, with the variations thereof correspondingly small, or the conductor must be of considerable diameter and mass, and therefore relatively insensitive and slow in its heating and cooling.

My invention also includes various improvements relating to the sensitive jet which are each of advantage when embodied in other forms and used in other combinations but which are especially adapted for use in combination with each other, and in substantially the form herein disclosed. These include means for establishing a smooth, silent cooling-jet, as for instance, providing means for supply of silent, vibrationless air, under steady normally constant pressure; converging the air toward and through a cylindrical outlet jet; establishing a normal, predetermined condition of incipient vibration in the jet which is insufficient by itself to produce the characteristic change of shape or dimensions of the jet; making this incipient vibration of desired, predetermined frequency; accomplishing this by a very faint, even inaudible, wave effect induced in the jet, preferably by the jet itself acting on a resonator, or by some other vibrator or even an obstruction arranged in sympathetic proximity to the jet; utilizing resonance of a laterally applied elastic vibrator, preferably an air column resonator to accomplish this; and utilizing the same, or a different air column resonator to magnify the effect upon the jet, of the periodic air waves or music-like sounds which are to be translated by the jet.

As applied to wireless telegraphy, my invention involves a new method of translating the received energy which consists in superposing upon the received waves or oscillations, locally generated waves or oscillations of a different frequency in association with an "audion" or equivalent detector, to thereby produce a composite or resultant frequency, analogous to the "beats" in music, or, as it is called in the electrical art, a "heterodyne." This electrical heterodyne is of lower frequency than either the received variations or the locally generated variations. This electrical heterodyne may be of a frequency such that when translated into sound, it will be well within the limits of audibility, and for some purposes it may be desirable to have it at the frequencies near maximum audibility.

The frequency of a heterodyne or of beats may be easily predetermined. For instance, if, as is common, the received electromagnetic waves come in at the rate of 100000 per second and if locally generated variations are 104000 per second, there will be certain times when the waves or impulses will be in step and there will be other times when they will be out of step. It is easy to figure out that the in-step situations will occur 4000 times per second and that the out-of-step situation will occur at intervals half way between, so that there will be periodic fluctuations of the total energy recurring 4000 times per second. This frequency of the fluctuation, or heterodyne, is therefore equal to the difference between the frequency of the received energy and the frequency of the locally generated energy, and varying the frequency of the latter will cause a numerically equal variation in the frequency of the heterodyne.

The production of electrical heterodynes in this way for the purpose of getting predetermined, low-frequency fluctuations from the very high frequencies of wireless is not in itself original with me, my method consisting in predetermining functioning of this heterodyne method then combining with such method of producing the electrical heterodyne, the further method which consists in producing a second heterodyne which is non-electrical, preferably by utilizing the electrical heterodyne to produce physical vibrations, preferably sound vibrations and then producing from said physical or acoustical vibrations, a physical or acoustical heterodyne of still lower frequency. The specific method which I employ is to cause the electrical heterodyne to produce vibrations of a telephone diaphragm; establish a condition of normally continuous physical vibration of the same or a slightly different frequency in a suitable local source; and then superpose these two sets of vibrations upon an instrumentality capable of responding to the resultant or composite waves or impulses. Where the two acoustic frequencies are different, the resultant will be "beats," or an acoustic heterodyne, of frequency different from and preferably lower than the component frequencies. The particular responsive instrumentality which I employ is the above described sensitive jet. The particular source of local physical vibrations is preferably an air column resonator. Preferably, the local vibrations are maintained continuously in the jet. The jet may be caused to produce its own vibrations by varying its pressure, velocity, or length in association with other suitable means tending to modify or obstruct its functioning so as to establish incipient "whistle" or flutter thereof, without precipitating its characteristic change of shape or dimensions.

Projecting the diaphragm vibrations, preferably strengthened by air column resonance, against the sensitive base of the jet already sensitized by vibrations of another frequency, produces in the jet, the resultant waves or acoustic heterodyne, with the effect that the characteristic break of the jet is precipitated at the frequency of the heterodyne, that is, as often as the two sets of air waves come into reinforcing coincidence. For instance, if as assumed above the electrical heterodyne and air waves produced therefrom are 4000 per second and the independently originated air waves are either 3000 per second or 5000 per second, the characteristic change of the jet will be precipitated 1000 times per second.

As will be more fully explained hereinafter, this action may be enormously magnified and stabilized through the instrumentality of a single air column resonator consisting of a pipe of suitable proportions, preferably stopped at one end by the telephone receiver diaphragm. In such case, the air column should be of such length as to give resonant response for the 5000 frequency, when excited by the air jet blowing past the open end thereof; and of responding to the 4000 frequency when excited from the other end by the diaphragm and finally of responding, preferably in its fundamental, to the 1000 frequency when excited by the sound "beats" or acoustical "heterodyne" and by the simultaneously resulting breaks in the form of the jet.

A single resonator having an air column of acoustic length equal to the quarter wave length of 1000 frequency will fulfil these requirements, since its harmonics considered as a stopped pipe sympathetically excited by the air jet across its mouth, will be the odd octaves, 3000, 5000 or 7000, and when excited from the diaphragm end so that it functions as an open pipe, its acoustic length becomes a half wave length and its natural frequencies will be the even octaves, 2000, 4000, etc. The stored up energy represented by the three sets of acoustical resonances, say 5000, 4000 and 1000 cannot be broken in upon by the irregular or static discharge impulses which are ordinarily the bane of wireless telegraphy. The local 5000 frequency resonance, though faint is continuous. The received 4000 frequency resonance is continuous for relatively long periods, that is to say, the duration of a Morse dash or dot, even the latter being very long as compared with 4000 per second. The resultant 1000 beat frequency or heterodyne resonance is established practically simultaneously with the commencement of each of the 4000 frequency wave trains, and the resulting 1000-per-second breaks of jet then act cumulatively to build up and maintain the 1000 resonance which is the continuing as well as primary cause of said breaks.

So long as the jet continues breaking at 1000 per second, it produces a continued lower average temperature and lower average resistance condition of the fine wire. The resulting average increase of current continuing during a dot wave train or a dash wave train may be utilized to operate the armature of any commercial recorder, either directly or through a relay. The retractile spring of the armature will be adjusted for a pull weak enough to be overcome by such increased current but strong enough to retract the armature between the dots and dashes when only the normal heating current is flowing.

By connecting a telephone receiver in the hot wire circuit, the dots and dashes may be heard as 1000 frequency notes which sound a relatively long time for the dashes and a shorter time for the dots. Frequently, also, it will be possible to hear at the same time but more faintly the 5000 frequency of the locally produced resonance and sometimes the 4000 frequency of the heterodyne of the transmitted waves. Where the received energy, that is the electrical heterodyne, is sufficiently powerful, it may be sufficient to precipitate breaking of the jet even when the latter is not sympathetically tuned to any special frequency; and it will be understood that all the other novel features of my method of translating the jet breaks, are of great advantage regardless of what method is used to precipitate said breaks. For instance, the air column resonator may be proportioned to resonate only to the frequency of the received energy of the electrical heterodyne, or, only to the locally originated frequency; the two sets of waves may be applied to the jet through the same or different instrumentalities and the diaphragm or its coil may be tuned or not tuned to the frequency of the received energy.

My invention also includes many minor features of purely mechanical or structural advantage, as for instance, the assembly and firm support in a single structure, insertible within a small case, of all the more essential parts of the apparatus, including silencing chambers for the air supply to the jet, the jet, the laterally applied resonator adjacent the jet, the receiving telephone fixed to the base of said resonator, the annular fine wire sensitive member supported in operative relation concentric with the jet but adjustable lengthwise thereof, and ampere meter which indicates the amount of current flowing in the circuit of the fine wire. It is thus a means of indicating the character and strength of the signals, the condition of adjustment of the air jet and incidentally it indicates the condition of the fine wire coils and battery.

A complete installation ready for application to any of the commercial wireless systems, to receive and record Morse or ticker tape, comprises, in addition to the above, only a motor driven fan to furnish the air pressure to the silencing chambers and a relay and recording set. The latter preferably consists of the following parts, preferably mounted and wired on a single board, namely a relay, preferably of the floating zero type which makes and breaks the relay circuit on rises and falls of current practically uninfluenced by the amount flowing; a tape recorder which may be a siphon recorder of ordinary type though I prefer a special type invented by myself; an unreeling stand for the type roll, a small motor for unreeling the tape beneath the recording stylus, and suitable binding posts for connections to the hot wire circuit and to the battery, for which latter a few dry cells will be sufficient.

The above and other features of my invention may be more fully understood from the following description in connection with the accompanying drawings, in which—

Figures 1, 2 and 3 on Sheet 1, show a complete recording set with all parts except wires and batteries.

In the drawings all of the parts except the auxiliary fan blower, the relay and the recorder are secured to a plate 1 which may form the top of a protecting case 2. As shown, the edges of the plate 1 rest in a rabbet 3 in the top edge of case 2 and constitutes in effect the top of said case. The bottom is closed in by a plate 4 secured in a similar rabbet 5 in the bottom of the case by screw 6 engaging a frame 7 which is a part rigid with the top plate 1.

The frame piece 7 is rigid with an upright 8 at one end supporting an air column resonator 9 and a telephone receiver 10. At the other end of 7 is an upright 11 having at its upper end a horizontal extension 12 secured by sleeve 13 extending through the top 1 and secured by collar 14 and flange sleeve 15 bearing on opposite sides thereof.

The frame piece 7 has rigidly secured to the under side thereof, preferably by soldering, a substantial sheet metal support or platform 16 on the upper side of which are secured the silencer chambers 17, 18 and on the under side of which are secured the tubular connection 19 leading to chamber 17, 20 connecting 17 and 18 and 21 leading from chamber 18 to the jet producing means. The silencer chambers 17 and 18 which are of rectangular construction afford substantially structural solidity and are in fact utilized as support means for securing the frame piece 7 and all connected parts to the top 1, the particular means shown being U-shaped brackets 22, 22 secured by screws 23 adjacent the four corners of top 1.

The ampere meter 24 is inset in the top as shown in the drawings so that the face thereof is approximately flush therewith.

In the sleeve 13 which projects through top 1 is a vertically slidable tube 25 adapted to be locked in desired position of adjustment by screw 25$^a$.

The tube 25 serves as the adjustable support for the heat sensitive member 26 which in this case comprises a continuous length of extremely fine platinum wire wound as a coil upon parallel supports of which 27 are preferably connected in circuit with the respective adjacent leading-in wires 28—49. The other support or supports 29 are preferably insulated from the fine wire 26 as also from each other and from supports 27.

For convenience the parallel supports are inserted in a non-conducting clamping plate 30 secured by screws 31 to another clamping plate 32 having a stud projection 33 removably fitting the lower end of tube 25 and secured therein by screw 34.

The lower end of the parallel supports 27, 29 are spaced apart by an insulating collar 35.

The lower face of 30 is provided with a central circular boss 36 of slight elevation which serves to radially deflect the air jet when it impinges thereon.

Beneath and in direct alinement with the axis of the heat sensitive coil 26 is arranged the jet producing means. As shown there is an outer tubular support 37 rigidly connected with frame member 7 as at 38. Into the lower end of this fits a similar tubular projection 39 rigid with plate 16 and communicating through it with air passage 21.

Into the upper end is fitted a slide nipple 40 which may be secured at a desired elevation by means of screw 44. The nipple is a cone terminating in a cylindrical projection 41. Interiorly it is formed with gradually converging walls 42 terminating in a straight cylindrical passage 43 for discharge of the jet.

On the front side of vertical support 8 is securing tubular resonator 9 extending adjacent jet 43 where it is provided with a nipple 45 converging to an orifice 46 which affords a cone frustum outlet rather than a cylindrical passage outlet. Preferably the axis of the resonator and the horizontal diameter of the orifice 46 are on a level with the jet outlet so that the resonant air column takes effect through the orifice on a level slightly above and slightly below the jet outlet. The jet is thus in a position analogous to but not precisely the same as that of the lips overlapping the mouth of a bottle when attempting to make it whistle a harmonic rather than a fundamental note thereof. The principal difference is that the jet is preferably parallel with the orifice so that it does not impinge thereon but merely influences the air column through the orifice by induced draft produced by the jet.

Figure 1:
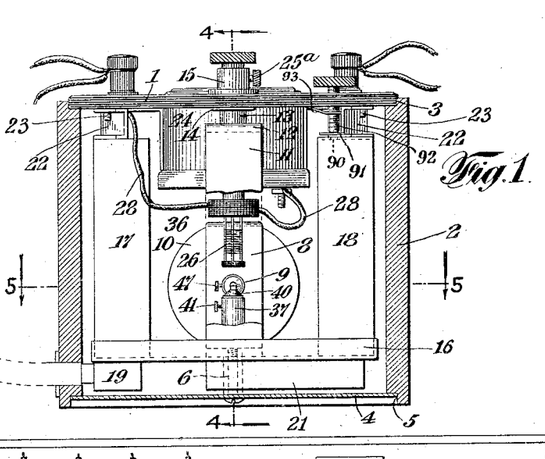
Fig. 1 is an elevation of the sensitive receiver set, the casing being shown in vertical section.
Figure 5:
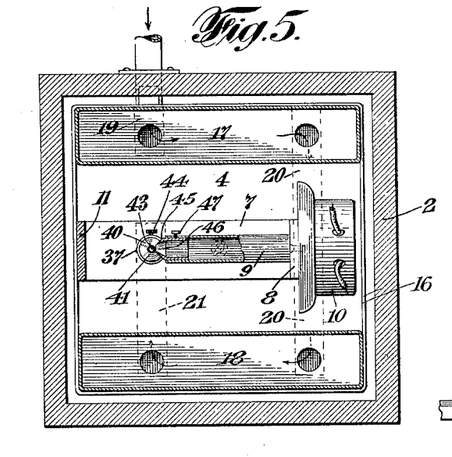
Fig. 5 is a horizontal section on the line 5—5, Fig. 1.
Figure 6:
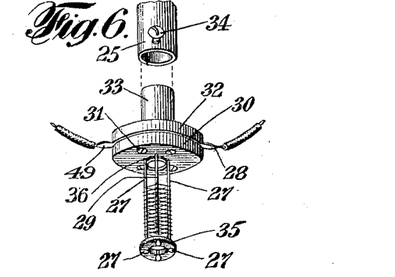
Fig. 6 is an elevational perspective detail of the heated sensitive element shown in Fig. 1.
Figure 7:
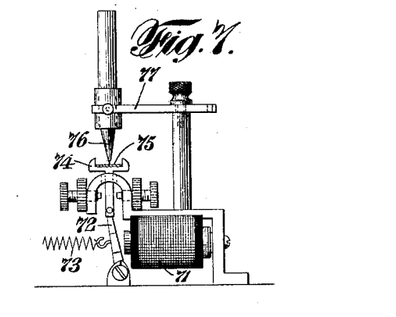
Fig. 7 is an elevation of the recorder viewed endwise of the tape.
Figure 8:
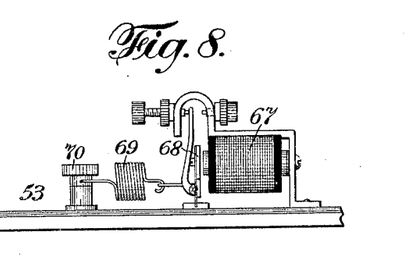
Fig. 8 is a side elevation of the relay.

The length of the resonant air column and the position of its orifice with reference to the jet may be adjusted by sliding the nipple 45 and securing it in desired position by means of screw 47. Preferably the air column orifice is about twice the cross section of the jet and may be about equal to the outside diameter of the jet nozzle as shown in Figs. 1 and 5.

The telephone receiver 10 may be of any standard make, either a commercially obtainable receiver of the type commonly used for wireless telegraph signals sounding at about 1000 per second or it may be especially designed for the 4000 frequency above referred to. In the latter case, the diaphragm may be selected to have a natural frequency of 4000, the same as the resonant air column and if desired, the coil may be specially designed for most efficient operation at the same frequency.

The ampere meter 24 may be of any desired construction. It is connected in series with a binding post through conductor 28 which is in series with sensitive wire 26, whence the circuit is through wire 49 to the other binding post.

Figure 2:
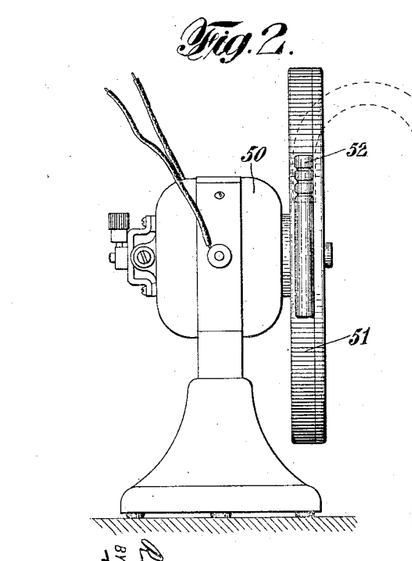
Fig. 2 is a side elevation of a motor driven fan for supplying air to the same.

The air for the jet may be supplied from any suitable source either of high pressure, through reducing valves, or, as the latter are apt to be noisy, directly from the fan shown in Fig. 2. The fan motor 50 may be of any desired construction and I have used motors designed for operation on two storage cells, say 3 or 4 volts. Where available, an alternating current induction motor would be desirable because of the very uniform speed which it maintains.

The motor drives a centrifugal blower of any desired type in case 51 discharging through outlet 52. The radial blades within the case may be of elastic spring material such as brass, yielding under the air pressure, and somewhat inefficient on that account, but nevertheless adequate, and having the advantage of being silent, that is not setting up sound vibrations which might travel to the jet and disturb its action.

Figure 3:
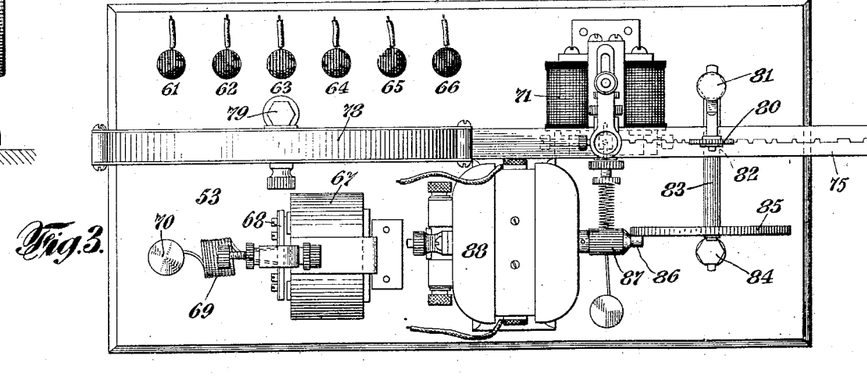
Fig. 3 is a top plan view of the relay and recording set.
Figure 4:
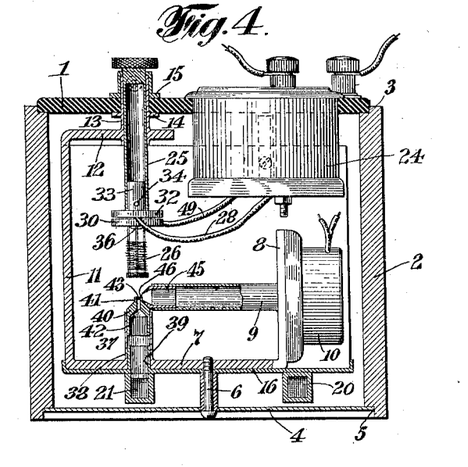
Fig. 4 is a vertical section on the line 4—4, Fig. 1.
Figure 9:
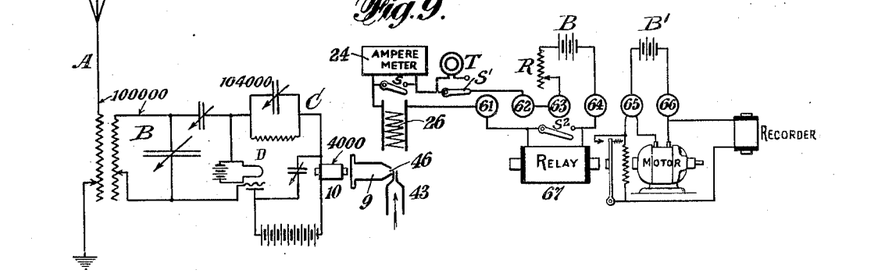
Fig. 9 is a diagram showing the wiring of the foregoing apparatus and also how it may be associated with a wireless telegraph receiving system.

Though the ampere meter may be sufficient as a visual indicator of fluctuations corresponding to the received message and though an ordinary telephone in series therewith may be a sufficient audible indicator, I prefer to use either in conjunction therewith or as a substitute therefor the receiver set shown in Fig. 3, the connections of which are shown in Fig. 9.

Referring to Fig. 3, the parts will be seen as mounted upon a single board 53 supplied with binding posts 61, 62, 63, 64, 65, 66, which are wired on the back side of the board to the apparatus as indicated in Fig. 9. The relay comprises the magnet with windings 67 operating on armature 68 retracted by spring 69 adjustable by rotary thumb-screw 70. The vibrations of the armature make and break the circuit of another source of power in the usual way. This circuit energizes the windings 71 to attract armature 72 retracted by spring 73 to laterally shift the guide 74 of tape 75 beneath the stylus 76 which may be nothing more than an old fashioned stylographic pen removably mounted in support 77. The tape roll 78 is suitably supported on a reel stand 79 whence it passes under the stylographic point and over guide 74 to a continuously driven feed mechanism which consists of bearing down wheel 80 mounted in stand 81 opposite to feed wheel 82 on shaft 83 having bearing in support 84 as well as in standard 81, and having rigid therewith a friction disk 85 driven by friction stud 86 on shaft 87 of motor 88.

Any desired means for changing speeds of motor or strengths of the various electric currents or air pressures may be employed. A specific means for adjusting the air pressure without changing the speed of the blower motor is shown in Fig. 1 as consisting of an outlet hole 90 in the top of silence chamber 18, the extent of the pressure vented therethrough being controlled by leaf spring 91 which can be variably depressed by screw 92, non-positively held in adjusted position by friction spring 93. By screwing down on the screw the vent may be completely closed or by the reverse operation may be opened to any desired extent. The pressure of the blower being constant the amount of relief through vent 90 will determine how much of this pressure will be effective on the jet 43.

The many ways in which the above apparatus may be connected up and operated have been indicated heretofore but one desirable way is diagrammatically indicated in Fig. 9. In this figure, the aerial A and the local oscillating circuit B are supposed to be tuned to and energized by received waves of 100000 frequency. A local oscillatory circuit C is supposed to be operatively associated therewith and with the audion D so that a heterodyne frequency of 4000 will be impressed upon telephone 10 and the resonator 9 may be tuned to the same frequency. The jet outlet 43 discharges in proximity to the contracted orifice 46 of resonator 9. The jet is directed along the axis of the fine wire coil 26 which is connected in series with the battery B through adjustable resistance R. There is an ampere meter 24 which may be thrown in series or shunted by means of switch $s$, a telephone transmitter T which may be shunted by switch $s^1$ and the relay 67 which may be shunted by switch $s^2$. With this arrangement the ampere meter may be put in series to measure the flow of normal heating current through the coil 26 and the variations of such flow may be utilized as the visual indicator of the received message. The telephone T may be thrown in or out to serve as an audible indicator and the relay 67 in or out to operate the recorder. The connections of the relay and recorder are through 61, 62, 63, 64, 65 and 66 which represent the binding posts shown on the relay and recorder board of Fig. 3.

The recorder circuit controlled by the relay includes the battery B′ connected to binding posts 65 and 66 which in turn are wired to serially connect the armature operated switch of the relay and the operating magnet of the recorder. The same battery energizes the motor for unreeling the tape through a parallel circuit across said binding posts 65, 66.

As previously stated, the jet when properly adjusted will be broken down by the air pulses caused by the diaphragm, taking effect through orifice 46 on the sensitive base of the jet at nozzle 43. This will happen regardless of any tuning provided the received energy by sufficiently powerful. As before explained, many degrees and kinds of tuning are possible.

Figure 10:
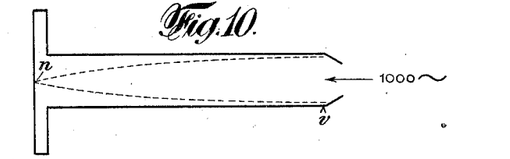
Figs. 10 to 14 inclusive are diagrams indicating possibilities of resonance of an air column resonator, Figs. 10, 11 and 12 as a stopped pipe at odd multiples of the same frequency and Figs. 13 and 14 as an open pipe at even multiples of the same frequency.
Figure 11:
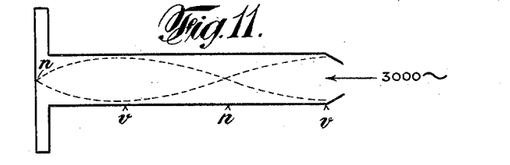
Figure 12:
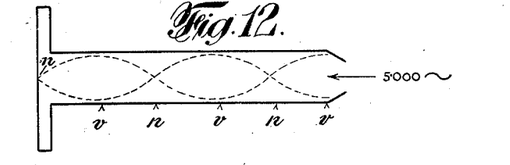

The simplest structural expedient and at the same time the most acoustical complex method is to have the resonator 10 adjusted in length so that the air column therein will have an acoustic length approximately one-fourth the length in air of a wave of 1000 frequency so that when excited through the orifice as shown in Fig. 10, and operating as a stopped pipe by reason of the telephone diaphragm at the base thereof, its fundamental resonant frequency will be 1000. When so vibrating the stationary wave is conventionally indicated by the dotted lines showing a node at $n$ and a vent at $v$. Such a resonator will be capable of resonating as a stopped pipe excited through the open end at frequencies which are an odd multiple of 1000, that is 3000 with nodes and vents as indicated in Fig. 11 or 5000 with nodes and vents as indicated in Fig. 12, or any higher odd multiples which are not illustrated but which are governed by the same law.

Figure 13:
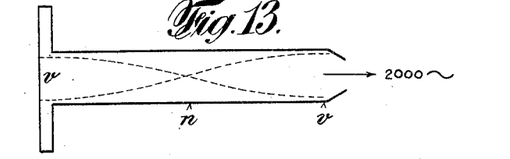
Figure 14:
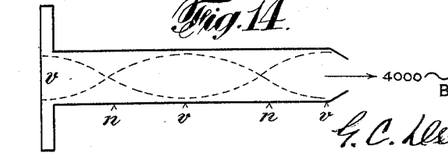

The same resonator when excited only by vibrations applied by the diaphragm at the other end thereof functions as an open pipe, resonating at the even multiples of 1000, that is, at 2000, with nodes and vents as indicated in Fig. 13 or 4000 with nodes and vents as indicated in Fig. 14.

A resonator having a diaphragm of sufficient stiffness so that it will resonate as a stopped pipe when excited from the open end by the air jet has remarkable advantages. A sympathetic effect of the jet when properly located and discharging at proper pressure will set up a faint but effective resonance in the tube at a 3000 frequency or, more desirably, a 5000 frequency. This internal resonance reacts on the jet and produces incipient vibration thereof at the 3000 or the 5000 frequency.

In this situation the 4000 frequency vibrations corresponding to the electrical heterodyne, being applied to the diaphragm at the base of the resonator, the air waves originating at the base will set up resonance at the 4000 frequency indicated in Fig. 14.

In this situation the acoustical resultant or heterodyne which is the numerical difference between 4000 and 5000 is 1000. The normally continuous 5000 frequency waves reinforced by the 4000 frequency received wave trains will precipitate characteristic change of the jet 1000 per second. 1000 per second, however, is the fundamental of the resonator when excited from the open end and the breaks of the jet reacting on the resonator from the open end thereof will excite the 1000 frequency resonance indicated in Fig. 10 which in turn will stabilize the frequency of the breaks at 1000 thereby obviating or greatly lessening the effectiveness of irregular static discharges which might otherwise tend to break in upon the functioning of the jet.

Obviously, analogous less complicated effects requiring greater power will be produced if the resonator be excited by the diaphragm at any of the frequencies indicated in Figs. 10 to 14 inclusive.

Similarly any stopped pipe of equivalent acoustic length adapted to be excited from the open end only will have the effect of tuning the jet to one or more of its natural frequencies according to which or how many of them are excited by the jet. This will of course depend upon the pressure and shape of the jet as well as upon its proximity, annular disposition and relative location, with respect to the base of the jet. An open pipe resonator may also be used for this purpose.

In referring to resonance at specified frequencies as for instance 1000, 4000, 5000, etc., it will be understood that in devices of this type the resonance effect can be produced by impulses through a considerable percentage range above or below the precise frequency named. The numbers selected are merely illustrative of numerical ratios suitable for producing an acoustic heterodyne of which the component frequencies are harmonics. Other frequencies may be used however.

It is not necessary to use an acoustical heterodyne since the jet may be tuned to the same frequency as that of the received impulses. It is not necessary that the tube which applies the received impulses to the jet be tuned since there is advantage in using for this purpose any tube having its outlet orifice partly above and partly below the level of the jet outlet. It is not necessary to use a tube to apply the received impulses since other parts of the apparatus will function properly regardless of the kind or mode of application of the received energy provided it be powerful enough to precipitate the bushing of the jet. It is not necessary to use an electrical heterodyne even for wireless purposes since any system giving a note of audible frequency in the operator's receiving telephone can be utilized in precisely the same way that the electrical heterodyne is utilized.

The message to be translated need not come by wireless since any means affording periodic electrical variations capable of giving a note in a telephone may be translated. For special purposes the note or periodic train of variations produced in the circuit of the hot wire of one sensitive jet device may be used as a received energy for translation in a second sensitive jet which may have any or all of the tuning above described. Electrically generated variations are not necessary since acoustical and other impulses applied to the diaphragm can be translated. A diaphragm, tuned or untuned, is not necessary since the vibration of a resonant air column can be excited in other ways, and a mere speaking tube or untuned sound guiding passage may be used in connection with any means for producing periodic air waves.

Many of the desired effects may be produced by a cooling jet normally in contact with a heat sensitive element. Many of the advantages may be obtained where a flaming jet is used instead of a cooling jet, or where the heat sensitive device is not a wire or where the changes produced therein by the jet are not translated through change of resistance by change of electric current flow.

Nevertheless all of the above described refinements mutually and remarkably contribute to give results heretofore unattainable. For illustration, the apparatus as described herein has been employed successfully and regularly to produce tape records such as shown in Fig. 3 in Chicago, from wireless messages sent out by stations in Germany, the record being remarkably clear and free from confusion by static. This is in marked contrast to other proposed methods which involve photographing on extremely sensitive film tape and then developing the record by photographic methods. The sensitiveness of the apparatus is remarkable and with proper adjustment it is capable of receiving and translating signals which in an ordinary operator's telephone are substantially inaudible. There is no reason why it cannot be made to operate on frequencies above the limit of audibility as well as on volumes of sound too faint for audibility.

The apparatus being adequate for translating extremely feeble received variations into corresponding impulses of power sufficient to operate the recorder, either directly or through the relay, it is obvious that by relaying once or twice more any existing power circuit could be effectively controlled to operate motors of any power desired.

I claim:

1. The method of translating sound vibrations which consists in causing said vibrations to effect characteristic change of shape of a cooling jet of gaseous fluid and utilizing said change of shape of the jet to variably cool an electric conductor of small mass normally heated by flow of electrical energy therethrough to thereby cause corresponding changes in the resistance of said conductor and resulting variations in the flow of said current; and, finally, utilizing said variations to produce a desired indication or effect.

2. The method of translating sound variations which consists in causing said variations to effect characteristic widening or bushing of a senstive cooling jet of gaseous fluid, causing the widened jet to cool a conductor of small mass heated to high temperature by flow of electric current therethrough, permitting said conductor to electrically reheat when the jet is restored to normal width, and utilizing the resulting changes of resistance and current flow in said conductor to produce an indication or effect.

3. The method of translating sound vibrations which consists in causing said vibrations to effect characteristic widening or bushing of a sensitive cooling jet of gaseous fluid, causing the widened jet to cool an encircling fine wire conductor heated to high temperature by flow of electric current therethrough and permitting said conductor to reheat when the jet is restored to normal width and utilizing the resulting changes of resistance and current flow in said conductor to produce an indication or effect.

4. The method of translating sound vibrations which consists in causing said vibrations to effect characteristic change of shape of a cooling jet and utilizing said change of shape of the jet to cool and thereby increase the resistance of an electric conductor of small mass normally heated to high temperature and utilizing said increase of resistance to produce an indication or effect.

5. The method of translating sound vibrations which consists in causing said vibrations to effect characteristic widening or bushing of a sensitive cooling jet of gaseous fluid causing the widened jet to cool a conductor of small mass, permitting reheating of said conductor when the jet is restored to normal width and utilizing the resulting changes of resistance in said conductor to produce an indication or effect.

6. The method of translating sound vibrations which consists in causing said vibrations to effect characteristic change of shape of a cooling jet and utilizing said change of shape of the jet to variably cool a heat sensitive element, and utilizing resulting variations in said heat sensitive element to produce an indication or effect.

7. The method of translating sound vibrations which consists in causing said vibrations to effect characteristic widening or bushing of a sensitive cooling jet of gaseous fluid, causing the widened jet to cool an extremely fine wire to vary a condition or quality thereof and utilizing such variation to produce an indication or effect.

8. The method of determining the normal condition of incipient vibration in a sound sensitive cooling jet of gaseous fluid which method consists in exposing a fine wire conductor, highly heated by flow of current therethrough, for variable cooling by the vibratory movements of said jet, and utilizing the resulting changes of resistance and current flow to produce quantitative effects in an indicator operatively associated with said circuit.

9. The method of determining and adjusting the normal condition of incipient vibration in a sound sensitive cooling jet of gaseous fluid which method consists in exposing a fine wire conductor highly heated by flow of current therethrough, for variable cooling by the vibratory movements of said jet, utilizing the resulting changes of resistance and current flow to produce effects in an indicator operatively associated with said circuit, and varying the velocity or length of the jet, its associated sympathetic vibrations, or other resonance factors, according to the intensity of said indications.

10. The method of determining and adjusting the normal working conditions of incipient vibration in the sound sensitive cooling jet of gaseous fluid in sound translating apparatus of the class described, which method consists in exposing a fine wire conductor highly heated by flow of current therethrough for cooling action by the vibratory movements of said jet and utilizing the resulting changes of resistance and current flow to produce quantitative effects in an ampere meter operatively associated with said circuit; adjusting the incipient vibration producing elements to produce a continuous note of frequency and intensity and percipitating characteristic change of shape of said jet when said sounds to be translated are superposed on said jet.

11. The method of producing a sensitive cooling jet which consists in supplying slightly compressed air rendered substantially noiseless by passage through the large volume silencing chambers and through a delivery passage of relatively large cross-section, directing gradual convergence of the air toward the end of said large area supply passage, permitting escape of said air through a passage of relatively small cross-section and adjusting the length of said jet by interposing a radially dispersing deflector in the path thereof.

12. The method of producing a sensitive cooling jet which consists in supplying slightly compressed air rendered substantially noiseless by passage through the large volume silencing chambers and through a delivery passage of relatively large cross-section, directing gradual convergence of the air toward the end of said large area supply passage, permitting escape of said air through a passage of relatively small cross-section.

13. The method of producing a sensitive cooling jet which consists in supplying slightly compressed air through a delivery passage of relatively large cross-section directing gradual convergence of the air toward the end of said large area supply passage, permitting escape of said air through a passage of relatively small cross-section and adjusting the length of said jet by interposing a radially dispersing deflector in the path thereof.

14. The method of producing a sensitive cooling jet which consists in supplying slightly compressed air through a short outlet passage of small, approximately circular cross-section and adjusting the length of said jet by interposing a radially dispersing deflector in the path thereof.

15. The method of establishing a predetermined sensitiveness for a sensitive cooling jet of gaseous fluid which consists in varying the length of the jet by a deflector interposed in the path of the jet.

16. The method of establishing a predetermined sensitiveness for a sensitive cooling jet of gaseous fluid which consists in varying the length of the jet by a radially dispersing deflector interposed in the path of the jet.

17. The method of establishing a condition of predetermined sensitiveness for a sensitive jet which consists in varying the pressure and length of said jet and simultaneously establishing therein a condition of acoustic vibration insufficient to precipitate characteristic bushing or shortening of the jet.

18. The method of increasing the sensitiveness of a sensitive jet which consists in laterally applying at the base thereof acoustic tone vibrations of strength insufficient to precipitate the characteristic change in length or diameter of the jet which method consists in applying an open mouth of an air column resonator laterally at the base of the jet in adjusted or predetermined relation to cause the jet to excite sympathetic vibrations of said air column resonator at one of its natural frequencies.

19. The method of increasing the sensitiveness of a sensitive jet which consists in laterally applying at the base thereof acoustic tone vibrations of strength insufficient to precipitate the characteristic change in length or diameter of the jet, which method consists in applying the mouth of an air column resonator laterally at the base of the jet partly above and partly below the level thereof to excite sympathetic vibration of said air column resonator at a harmonic natural frequency thereof.

20. The method of repeatedly precipitating characteristic change of shape of a sound sensitive jet of gaseous fluid, which method consists in applying in operative relation to the base of said jet the open end of a stopped-pipe, air-column resonator, the stopped end of which consists of a diaphragm tuned to a natural frequency of said air column; then applying to said diaphragm periodic energy variations of the same frequency as the natural frequency of said diaphragm.

21. The method of repeatedly precipitating characteristic change of shape of a sound sensitive jet of gaseous fluid, which method consists in applying transversely to the base of said jet, partly above and partly below the level thereof, the open end of a stopped-pipe, air-column resonator, the open end of which is contracted to facilitate induced resonance by the action of the jet and the stopped end of which consists of a diaphragm tuned to a natural frequency of said air column; then applying to said diaphragm periodic energy variations of the same frequency as the natural frequency of said diaphragm.

22. The method of repeatedly precipitating characteristic change of shape of a sound sensitive jet of gaseous fluid, which method consists in applying in operative relation to the base of said jet the open end of an air-column resonator, one end of which is closed by an elastic diaphragm; then applying to said diaphragm periodic energy variations of a frequency which is a natural frequency of said air-column.

23. The method of producing characteristic change of shape of a sensitive jet which consists in establishing incipient vibration of said jet at a desired frequency by air waves projected laterally against the base thereof from the open mouth of a suitable passage and then precipitating the characteristic change of shape of said jet by projecting additional air waves through the same lateral passage to produce said change of shape.

24. The method of producing characteristic change of shape of a sensitive jet which consists in establishing incipient vibration of said jet at a desired frequency by air waves projected laterally against the base thereof from the open mouth of a suitable passage and then precipitating the characteristic change of shape of said jet by projecting through the same lateral passage air waves of a slightly different frequency coöperating with said first mentioned air waves to produce periodic beats of intensity sufficient to produce said change of shape.

25. The method of producing characteristic change of shape of a sensitive jet which consists in causing incipient vibration of said jet at a desired frequency and then precipitating the characteristic change of shape of said jet by action of intermittently excited elastic oscillations of a slightly different frequency coöperating with said first mentioned oscillations to produce beats.

26. The method of producing characteristic change of shape of a sensitive jet which consists in causing incipient vibration of said jet at a desired frequency by action of continuously excited elastic oscillations and then precipitating the characteristic change of shape of said jet by action of intermittently excited elastic oscillations of a slightly different frequency coöperating with said first mentioned oscillations to produce beats.

27. The method of producing characteristic change of shape of a sensitive jet which consists in causing incipient vibration of said jet at a desired frequency and then precipitating the characteristic change of shape of said jet by air waves of a slightly different frequency coöperating with said incipient vibrations to produce sound wave beats.

28. The method of producing characteristic change of shape of a sensitive jet which consists in causing incipient vibration of said jet at a desired frequency by air waves of said frequency and then precipitating the characteristic change of shape of said jet by additional air waves.

29. The method of producing characteristic change of shape of a sensitive jet which consists in causing incipient vibration of said jet at a desired frequency by air waves of said frequency and then precipitating the characteristic change of shape of said jet by additional air waves from another source of energy.

30. The method of producing characteristic change of shape of a sensitive jet which consists in causing incipient vibration of said jet at a desired frequency by air waves of said frequency and then precipitating the characteristic change of shape of said jet by air waves of a slightly different frequency coöperating with said first mentioned air waves to produce beats.

31. The method of tuning a sound-sensitive jet to establish a normal condition of increased sensitiveness, and of subsequently precipitating characteristic change of shape thereof, which method consists in laterally applying one end of an air column resonator in sympathetic relation to the base of said jet to excite sympatheic vibration of the said air column at one of its natural frequencies, but of strength insufficient to precipitate characteristic change of shape of said jet, and then precipitating said change by applying vibratory energy to said air column resonator at the remote end thereof.

32. The method of tuning a sound-sensitive jet to establish a normal condition of increased sensitiveness, and of subsequently precipitating characteristic change of shape thereof, which method consists in laterally applying one end of an air column resonator in sympathetic relation to the base of said jet to excite sympathetic vibration of the said air column at one of its natural frequencies, but of strength insufficient to precipitate characteristic change of shape of said jet, and then precipitating said change by applying vibratory energy to said air column resonator at the remote end thereof to excite said air column at a different natural frequency.

33. The method of tuning a sound-sensitive jet to establish a normal condition of increased sensitiveness, and of subsequently precipitating characteristic change of shape thereof, which method consists in laterally applying the open end of a stopped-pipe, air-column resonator in sympathetic relation to the base of said jet, varying the velocity of the jet to excite vibration of said air column at one of its natural frequencies of strength insufficient to precipitate critical change of form of said jet, then precipitating said change of form by vibrating the stopped end of said resonator to excite resonant vibration of the same at another natural frequency.

34. The method of tuning a sound-sensitive jet to establish a normal condition of increased sensitiveness and of precipitating characteristic change of shape thereof, which method consists in laterally applying the open mouth of a stopped-pipe, air-column resonator in sympathetic relation to the base of said jet, varying the velocity of the jet to excite vibration of said air column at odd multiple of its fundamental frequency, but of strength insufficient to precipitate critical change of form of said jet, then precipitating said change of form by vibrating the stopped end of said resonator to excite resonant vibration of the same at an even multiple of said fundamental frequency to produce beats at another natural frequency of said resonator.

35. The method of tuning a sound-sensitive jet to establish a normal condition of increased sensitiveness and of subsequently precipitating characteristic change of shape thereof, which method consists in laterally applying the open end of a stopped-pipe, air-column resonator in sympathetic relation to the base of said jet, varying the velocity of the jet to excite vibration of said air column at a frequency five times its fundamental but of strength insufficient to precipitate critical change of form of said jet, then precipitating said change of form by vibrating the stopped end of said resonator to excite resonant vibration of the same at four times its fundamental frequency to thereby create beats at the rate of said fundamental frequency.

36. The method of periodically precipitating a characteristic change of shape of a sound-sensitive jet at a desired rate of frequency by means of periodic variations of a higher frequency, which method consists in laterally applying in sympathetic relation to the base of said jet the open end of a stopped-pipe resonator having an air-column of acoustic length equal to a quarter wave length of an acoustic wave of said first mentioned frequency, predetermining the characteristics of the jet and the location of the resonator to excite sympathetic vibration of said air column and of said jet, at an odd multiple of the fundamental of said stopped-pipe air column but of strength insufficient to precipitate said characteristic change of shape of said jet; then vibrating the stopped end of said resonator at a frequency which is an even multiple of said fundamental frequency to thereby produce beats at the frequency of said fundamental.

37. The method of repeatedly precipitating characteristic change of shape of a sound sensitive jet at a desired rate or frequency by means of periodic variations of a higher frequency which method consists in laterally applying in sympathetic relation to the base of said jet the open end of a stopped-pipe resonator having an air column of acoustic length equal to a quarter wave length of an acoustic wave of said frequency, predetermining the velocity of the jet and the location of the resonator to excite sympathetic vibration of said air column and of said jet, at a frequency which is five times the fundamental of said stopped-pipe air column, but of strength insufficient to precipitate said characteristic change of shape of said jet; then vibrating the stopped end of said resonator at a frequency which is four times said fundamental frequency to thereby produce beats at the frequency of said fundamental of said resonator.

38. The method herein set forth which consists in producing a heterodyne from a transmitted current utilizing said heterodyne to produce physical vibrations, producing a second heterodyne from said physical vibrations and utilizing said second heterodyne to influence a sensitive jet.

39. The method herein set forth which consists in producing a heterodyne by impressing a local oscillating current upon a transmitted oscillating current, utilizing said heterodyne to produce sound waves in air, producing a second heterodyne from said sound waves, applying said second heterodyne to influence a sensitive jet and translating the resulting jet variations.

40. The method herein set forth which consists in producing a heterodyne by impressing a local oscillating current upon a transmitted oscillating current, utilizing said heterodyne to produce sound waves in air, producing a second heterodyne from said sound waves, applying said second heterodyne to influence a sensitive jet and translating the resulting jet variations by causing them to produce variations in a heat sensitive element.

41. Apparatus of the class specified comprising means for producing a heterodyne consisting of means for impressing a local periodic current upon a transmitted periodic current, and means for producing an acoustic heterodyne consisting of means for subjecting a sensitive jet to energy derived from said first mentioned heterodyne, and means for translating the resulting jet variations, comprising a telephone receiving instrument connected with means controlled by said sensitive jet.

42. In apparatus of the class described, the heat sensitive member in combination with a sensitive cooling jet adapted to have varied cooling effects thereon according to changes of shape or dimensions induced in the jet.

43. Apparatus according to claim 42 in which the heat sensitive element is an electric conductor consisting of extremely fine wire, located out of alinement with the normal path of the jet.

44. Apparatus according to claim 43 in which the fine wire surrounds the jet.

45. Apparatus according to claim 44, in which the heat sensitive member and the jet are relatively adjustable in a line parallel to the axis of the jet.

46. In apparatus according to claim 45 in which the jet is stationary and the heat sensitive member is adjustable.

47. In apparatus of the class described, a heat sensitive member and means for producing a sensitive jet therefor comprising means for supplying gaseous fluid under pressure, a conduit therefrom terminating in a nozzle, large volume silencing chambers in said conduit and means for venting pressure therethrough to vary the effective pressure at the nozzle, in combination with the discharge nozzle.

48. In apparatus according to claim 47, a discharge nozzle having conically converging walls.

49. In apparatus according to claim 48, a cylindrical outlet passage leading from said converging walls.

50. In an apparatus of the class described, a heat sensitive member and means for projecting the cylindrical jet of gaseous fluid in combination with an air column resonator laterally applied at the base of the jet.

51. In apparatus according to claim 50 having the open end of the resonator a contracted orifice.

52. In apparatus according to claim 50, having the remote end of said resonator stopped.

53. In apparatus according to claim 50, means for vibrating the stopped end of said tube by the energy variations to be translated.

54. In apparatus according to claim 50 in which means is provided for exciting resonance of said air column resonator by energy variations of the same frequency.

55. In apparatus of the class described, a receiver set comprising a plate, an ampere meter inset therein, a fine wire coil adjustably supported thereby, rectangular silencing chambers forming two sides of an inclosure, a plate secured to the bottom of said silencing chambers forming a bottom for said closure and means for supporting a jet nozzle in alinement with the axis of said heat sensitive coil, an air column resonator in operative relation to said nozzle, and a telephone receiver in operative relation to the base of said resonator.

56. In apparatus according to claim 55, an integral frame or bracket arranged to support in proper spaced relation the said heat coil, jet, resonator and receiver.

57. In apparatus of the class described, a rigid frame for supporting the following parts; a telephone receiver and resonator therefor, a jet nozzle in close proximity to the open end of said resonator and a fine wire open coil having its axis in alinement with the jet.

58. In apparatus according to claim 57, a support for the fine wire slidable in said frame to adjust said wire in the direction parallel with the axis of the jet.

59. In apparatus of the class described, a telephone receiver, jet producing means, a tube leading from the telephone receiver to the jet having a contracted orifice partly above and partly below the outlet of the jet.

60. In apparatus of the class described, means for producing a sensitive jet, a telephone receiver having a resonant passage with the open end thereof in close proximity to the jet, said resonator having the same natural frequency as the sounds to be produced in said telephone receiver, a sensitive member comprising parallel lengths of fine wire near but not in the path of the jet when in normal condition, a battery for heating said fine wire to the high temperature.

61. A wireless receiving system adapted to produce an electrical heterodyne of audible frequency, a receiver and an air column resonator tuned to the frequency of said electrical heterodyne and energized thereby, a sensitive cooling jet discharging across the mouth of said resonator, a hot wire coil surrounding the jet, a battery for heating said coil to high temperature, a floating zero relay in series in said battery circuit, a second battery and recorder in circuit with the switch of said relay.

Signed at New York city in the county of New York and State of New York this 28th day of May, A. D. 1919.

RAY EDWIN HALL.